United States Patent
Hoshikawa et al.

(10) Patent No.: US 10,073,680 B2
(45) Date of Patent: Sep. 11, 2018

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventors: Sayuri Hoshikawa, Tokyo (JP); Fumikazu Fujiwara, Tokyo (JP); Ryosuke Aoki, Tokyo (JP); Congqin Chen, Tokyo (JP); Hidetomo Suzuki, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 15/306,864

(22) PCT Filed: Jun. 25, 2014

(86) PCT No.: PCT/JP2014/066823
§ 371 (c)(1),
(2) Date: Oct. 26, 2016

(87) PCT Pub. No.: WO2015/198419
PCT Pub. Date: Dec. 30, 2015

(65) Prior Publication Data
US 2017/0046133 A1 Feb. 16, 2017

(51) Int. Cl.
*G06F 9/44* (2018.01)
*G06F 9/45* (2006.01)
(Continued)

(52) U.S. Cl.
CPC .................. *G06F 8/34* (2013.01); *G06F 8/31* (2013.01); *G06F 9/45504* (2013.01)

(58) Field of Classification Search
CPC ...... G06F 8/31–8/34; G06F 9/45504–9/45554
See application file for complete search history.

(56) References Cited

U.S. PATENT DOCUMENTS 5,410,331 A * 4/1995 Schuneman .......... G06T 11/001
                                                                345/602
5,537,630 A * 7/1996 Berry ........................ G06F 8/33
                                                                715/763
(Continued)

FOREIGN PATENT DOCUMENTS

JP        60-100226 A     6/1985
JP        2005-242682 A   9/2005
JP        2005-309593 A   11/2005

OTHER PUBLICATIONS

Microsoft Robotics, VPL Tutorial 1—Hello World, pp. 1-4, 2012. http://msdn.microsoft.com/en-us/library/bb483092.aspx (Year: 2012).*

(Continued)

*Primary Examiner* — Mongbao Nguyen
(74) *Attorney, Agent, or Firm* — Sughrue Mion, PLLC

(57) ABSTRACT

The present invention aims to provide a more generally applicable programming environment for visual programming languages than conventional programming environments and to reduce data size of programs. With programming language data (a text VPL), which is a text based programming language data combining functions and connection characters composed of character data and defines relationships between the functions based on positional relations of the functions with reference to the connection characters in a display space of a text editor, the functions and the connection characters in character strings of the programming language data are distinguished and relationships between the functions are interpreted based on the positional relations in the display space. Interpretation of the text VPL enables a computer device to perform processing according to the text VPL, consequently realizing a generally applicable programming environment and reducing program data size.

7 Claims, 7 Drawing Sheets

(51) Int. Cl.
   *G06F 8/34* (2018.01)
   *G06F 8/30* (2018.01)
   *G06F 9/455* (2018.01)

(56) References Cited

U.S. PATENT DOCUMENTS

| | | | | |
|---|---|---|---|---|
| 7,661,096 B2* | 2/2010 | Meijer | G06F 9/4484 | 717/140 |
| 7,685,564 B2* | 3/2010 | Renner | G06F 8/33 | 715/771 |
| 7,797,739 B2* | 9/2010 | Andreev | G06F 11/008 | 726/16 |
| 7,937,694 B2* | 5/2011 | Meijer | G06F 9/4484 | 717/151 |
| 8,468,511 B2* | 6/2013 | Lapkowski | G06F 8/4441 | 717/140 |
| 9,182,962 B2* | 11/2015 | Kneisel | G06F 8/31 | |
| 9,250,925 B2* | 2/2016 | Scipione | G06F 8/24 | |
| 2002/0007483 A1* | 1/2002 | Lopez | G06F 8/31 | 717/122 |
| 2005/0289506 A1* | 12/2005 | Renner | G06F 8/33 | 717/105 |
| 2008/0271001 A1* | 10/2008 | Nonomura | G06F 21/125 | 717/143 |
| 2009/0037876 A1* | 2/2009 | Meijer | G06F 8/33 | 717/113 |
| 2011/0252400 A1* | 10/2011 | Scipione | G06F 8/24 | 717/108 |
| 2011/0314448 A1* | 12/2011 | Biggerstaff | G06F 8/456 | 717/116 |
| 2012/0192151 A1* | 7/2012 | Parkes | G06F 8/10 | 717/120 |
| 2014/0196003 A1* | 7/2014 | Sakimura | G06F 8/35 | 717/105 |
| 2014/0282180 A1* | 9/2014 | Orofino | G06F 3/0484 | 715/771 |
| 2014/0282364 A1* | 9/2014 | Woodward | G06F 8/34 | 717/105 |

OTHER PUBLICATIONS

Nouman Tariq, Visual Programming Language for Tacit Subset of J Programming Language, pp. 8-40, 2013. http://eprints.maynoothuniversity.ie/4559/1/Nouman_Tariq.pdf (Year: 2013).*

Niyazi Ari, Programming Languages, pp. 1-8, 2014. https://ieeexplore.ieee.org/stamp/stamp.jsp?tp=&arnumber=6997548 (Year: 2014).*

Pavel Smutny, Visual Programming for Smartphones, pp. 358-361, 2011 https://ieeexplore.ieee.org/stamp/stamp.jsp?tp=&arnumber=5945879 (Year: 2011).*

International Search Report for PCT/JP2014/066823 dated Aug. 26, 2014.

* cited by examiner

FIG. 3

```
isOver30--isMan-Car
    |         |
    |     is14thFeb--isPinkLover--giveCarnation-bookRestaurant
    |         |              |
    |     giveRose    isYellowLover--giveSunflower
    |                         |
    |                     giveCosmos
    |
isOver20--isSweetsLover--giveKahluaMilk
    |              |
    |         giveLemonSour
giveToy
```

FIG. 5

```
if(isOver30()=='y'){
        if(isMan()=='y'){
                Car();
        }else if(is14thFeb()=='y'){
                if(isPinkLover()=='y'){
                        giveCarnation();
                        bookRestaurant();
                }else if(isYellowLover()=='y'){
                        giveSunflower();
                }else{
                        giveCosmos();
                }

}else{
                giveRose();
        }
}else if(isOver20()=='y'){
        if(isSweetsLover()=='y'){
                givekahluaMilk();
        }else{
                giveLemonSour();
        }
}else{
     giveToy();
}
```

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2014/066823 filed Jun. 25, 2014, the contents of which are incorporated herein by reference in their entirety.

TECHNICAL FIELD

The present invention relates to an information processing device and a method for the information processing device, a program implementing the information processing device, and a storage medium storing the program. Particularly, the present invention relates to a technical field of interpreting a visual programming language.

CITATION LIST

Patent Literature

Patent Literature 1: Japanese Unexamined Patent Application Publication No. 2005-309593
Patent Literature 2: Japanese Unexamined Patent Application Publication No. 2005-242682

BACKGROUND ART

Visual Programming Languages (hereinafter referred to as "VPL"), which display a program in a visually understandable manner, for example, using a flowchart, a function block diagram, or the like, are prevalent (For example, Japanese Unexamined Patent Application Publication No. 2005-309593 and Japanese Unexamined Patent Application Publication No. 2005-242682).

In VPL, programs are created in a display space provided by a programming editor. In the display space, relationships between program objects are established, for example, by placing program objects in the display place, connecting the program objects with a connection line, and the like.

Compared with other non-VPL programming languages, such as C, VPL is advantageous in that a program content can be instinctively understood and is easier to edit.

SUMMARY OF INVENTION

Technical Problem

Meanwhile, existing VPLs provide a programming environment where a plurality of types of "boxes" with a distinctive meaning, such as a diamond box (discrimination processing) in a flowchart are furnished. Under such environment, programs are created by operations such as placement of boxes, character input in the boxes and connection of boxes with connection lines. Accordingly, specialized software, not simple drawing software, is required to create and edit programs.

Furthermore, there is a problem that data size of a program in VPL becomes greater than the data size of a program in a programming language like C that uses only character data, since in addition to the character data, VPL employs data with specialized attributes such as above-described "boxes" in a visually understandable manner.

The present invention aims to solve the above-described problems. An object of the present invention is to provide a more generally applicable programming environment for Visual Programming Languages and reduce program data size.

Solution to Problem

First, an information processing device according to the present invention is an information processing device having a storage unit storing programming language data that is text based programming language data combining functions and connection characters composed of character data, and defines a relationship between the functions based on a positional relation between the functions with reference to the connection characters in a display space of a text editor, and also having an interpretation processing unit configured to distinguish the functions and the connection characters in a character string of the programming language data and interprets a relationship between the functions based on the positional relation in the display space.

A programming language according to the present invention is a text base programming language, but displays relationships between the functions based on positional relations between the functions with reference to connection characters in a display space of a text editor in a visually understandable way. That is, the programming language according to the present invention functions as a Visual Programming Language (hereinafter, referred to as "VPL"). Such a text based visual programming languages (hereinafter referred to as "text VPL") do not require special software to create and edit programs, thus realizes a generally applicable programming environment. In addition, since such VPL is text based, program data size can be relatively reduced. The information processing device according to the present invention enables interpretation of a text VPL, so as to realize a programming environment for such text VPL.

Second, with the above-described information processing device according to the present invention, the following is preferable. The information processing device has a discrimination function representing discrimination processing as the functions and a first connection character connecting the functions positioned separately in a horizontal direction and a second connection character connecting the functions positioned separately in a vertical direction in the display space as the connection characters, and the interpretation processing unit identifies a character data type of each character on each line in the programming language data, distinguishes the functions and the connection characters, and discriminates whether the function is the discrimination function or not, then for the function discriminated as the discrimination function, associates a right side function connected to the function via the first connection character as a function to be executed in one of a Yes branch or a No branch, and associates a lower side function connected to the function via the second connection character as a function to be executed in another of the Yes branch or the No branch.

Thus, programs visually represented as flowcharts can be interpreted.

Third, with the above-described information processing device according to the present invention, the following is preferable. The interpretation processing unit discriminates whether a function is the discrimination function or not, based on presence or absence of predetermined characters in the function.

Discrimination of a discrimination function based on the presence or absence of predetermined characters in a function eliminates a need to read to the next line of the line on which a target function is present, when discriminating whether the function is a discrimination function or not.

Fourth, with the above-described information processing device according to the present invention, the following is preferable. The interpretation processing unit treats the first connection characters positioned successively in the horizontal direction and the second connection characters positioned successively in the vertical direction as a single unit.

Thus, successive positioning of the first connection characters and successive positioning of the second connection characters can be permitted as a programming rule of the text VPL.

Fifth, with the above-described information processing device according to the present invention, the following is preferable. The interpretation processing unit generates an intermediate code as a code prior to translation into a machine language, based on result of interpreting relationships between the functions.

Thus, the text VPL can be translated into an intermediate code in a predetermined programming language, such as C.

Sixth, with the above-described information processing device according to the present invention, the following is preferable. The information processing device includes a performance control unit configured to control to perform processes according to the intermediate code one by one in a predetermined module unit based on a unit of the functions.

By performing processes one by one, programs can be modified flexibly. In addition, for performing processing, the need to translate the entire intermediate code to a machine language is eliminated.

An information processing method according to the present invention is an information processing method in an information processing device having a storage unit storing a programming language data that is a text based programming language data combining functions and connection characters composed of character data, and defines a relationship between the functions based on a positional relation of the functions with reference to the connection characters in a display space of a text editor, and also having interpretation procedure of distinguishing the functions and the connection characters in a character string of the programming language data and interpreting relationships between the functions based on the positional relations in the display space.

The information processing method according to the present invention, as well as the above-described information processing device according to the present invention, enables interpretation of the text VPL, so as to realize a programming environment in the text VPL.

A program according to the present invention is a program causing an information processing device to perform the processing as the information processing method.

Further, a storage medium according to the present invention is a program storing the above-mentioned program. The program and the storage medium achieve the above-described information processing device.

Advantageous Effects of Invention

According to the present invention, the following is achieved. By allowing the interpretation of a text VPL, the processes instructed in the text VPL can be performed in a computer device and a programming environment employing the text VPL is achieved.

Accordingly, generally applicable programming environment can be realized and program data size can be reduced.

BRIEF DESCRIPTION OF THE DRAWINGS

FIG. 3 is a diagram for describing a text VPL.

FIG. 5 is a diagram showing exemplary translation of a program in the text VPL illustrated in FIG. 3 to an intermediate code.

DESCRIPTION OF THE EMBODIMENTS

Figure 1:
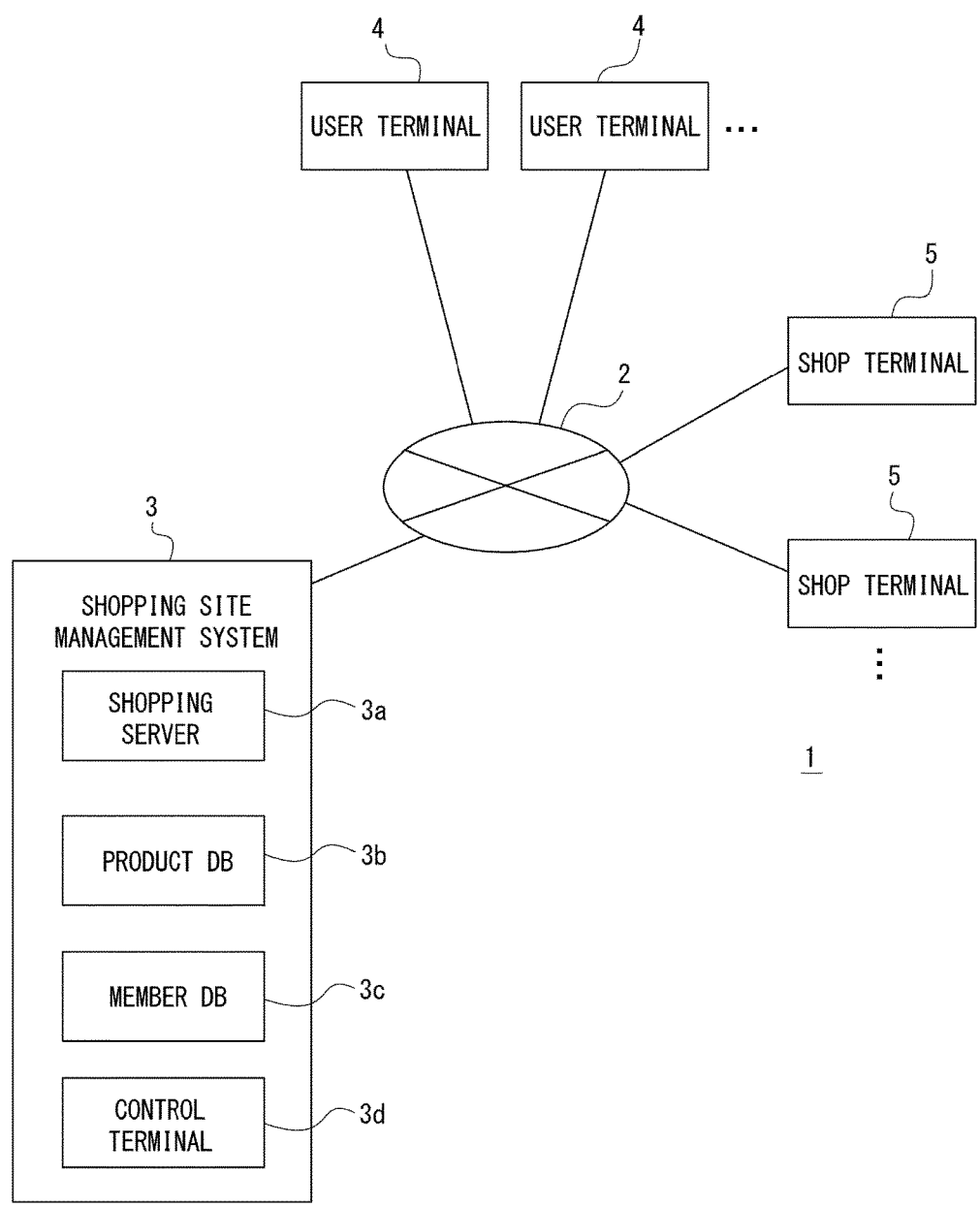
FIG. 1 is a diagram describing an exemplary network system of an embodiment of the present invention.

The following describes embodiments in the order listed below.
1. A network system
2. A hardware configuration of a computer device
3. A text VPL
4. Performance Control of interpretation and processing of the text VPL
5. Processing Procedure
6. Summary of Embodiments
7. A Program and a Storage Medium
8. Variation 1. A Network System FIG. 1 describes an example of a network system 1, which is assumed in this embodiment. The network system 1 functions as electric commerce (hereinafter, EC) system.

The network system 1 is configured by a shopping site operation system 3, a plurality of user terminals 4, 4 . . . , and a plurality of shop terminals 5, 5 . . . , via a network 2, for example, as the Internet, in a mutually communicable manner.

The user terminal 4 is a computer device equipped with a web browser. The user terminal 4 may include a mobile phone of an advanced function (so-called a smartphone), a mobile phone, a Personal Digital Assistant (PDA), and a portable or desktop personal computer (PC), for example. However, the user terminal 4 is not limited to the devices described above.

The user terminal 4 sends Hypertext Transfer Protocol (HTTP) requests to the shopping site management system 3 to require a web page and predetermined processes. Further, the user terminal 4 receives and displays in a web browser a web page sent in response to the HTTP requests. Accordingly, a user can browse and manipulate a desired web page.

The shopping site management system 3 includes a shopping server 3a, a product database (DB) 3b, a member DB 3c, and a control terminal 3d, each configured of a computer device. Each of the devices can communicate one another via a network such as Local Area Network (LAN).

The shopping server 3a performs various processes based on HTTP requests sent by the user terminal 4. For example, the shopping server 3a performs processes of creation and transmission of a variety of web pages (for example, a product web page, a shopping cart web page, an order web page and the like), and also purchase processes in response to order placement by a user.

In the network system 1, a web site for a virtual shopping mall (an EC site) is provided for a user (a user of the terminal 4) by the shopping server 3*a*. In the EC site, there are a plurality of shops (member shops of the virtual shopping mall). As a staff member at each shop registers products of the shop through a computer device as the shop terminal 5, a variety of products are uploaded to the EC site by different shops. A user can access the EC site via the user terminal 4 and purchase a desired product.

The product DB 3*b* stores information on products registered through the shop terminal 5. Specifically, product information such as a product name, a type, a product image, specifications and an abstract for product introduction, advertisement information, and the like are stored in association with a product ID, which is an identifier to distinguish different products. In addition, the product DB 3*b* stores files of a product web page written in a markup language, such as Hyper Text Markup Language (HTML) and Extensible Markup Language (XML), and the like.

The product DB 3*b* as described above enables a product search and the like based on an input keyword and the like.

When using the EC site, a user can register for a membership on the shopping site management system 3. For registration, a user registers required information, such as user identification (a user ID), a mailing address of products (information on address), and a credit card number. Login to the EC site with registered user ID saves user's trouble of fulfilling required information each time the user purchases a product on the EC site.

The member DB 3*c* may store information to be managed to each member, such as a user ID, which is registered at the time of the above-described user registration. For example, user's personal information (such as a name, an age, a birth date, a gender, an address, and the like) is stored in the member DB 3*c*. In addition, particularly in this example, the member DB 3*c* stores browsing history information of product web pages, product purchase history information of each member, and the like.

Further, the shopping server 3*a* performs processing of displaying advertisement data in a predetermined web page (for example, a front page, and the like) on the EC site. At the time of this processing, the shopping server 3*a* is configured to select the displayed advertisement data items, depending on the information stored in the member DB 3*c* and member attribute information (for example, favorite things and pastime, and the like) gained from analysis of the stored information.

The control terminal 3*d* is an embodiment of an information processing device according to the present invention. In this embodiment, the control terminal 3*d* is used to control processing performed by the shopping server 3*a*, when performing various operation tests on the shopping server 3*a*.

In this example, an operation test is conducted in a manner of a comparison test (so-called an A/B test), that discriminates which advertisement data item to display among candidates of advertisement data items, when selecting advertisement data items as described above. Specifically, an A/B test of this case is, for example, performed as follows. If the member who browses the web page is "a man", when two advertisement data items "a car" and "a watch" exist as candidates for an advertisement data item targeting "a man", the advertisement data item "a car" is displayed on the web page to obtain evaluation result of user response to the advertisement data item, and the advertisement data item "a watch" is also displayed to obtain evaluation result of user response. Then, the obtained evaluation results are compared and the advertisement data item with a better evaluation is selected as an advertisement data to be displayed. As an "evaluation result" for the operation test, for example, Click Through Rate (CTR) of the displaying advertisement data may be employed. Alternatively, Conversion Rate (CVR) for a related product may be employed, when the displaying advertisement data contains a link to a product web page, and the like.

The control terminal 3*d* in this example, for example, functions as a program creation device creating programs to stipulate processing performed by the shopping server 3*a* at the time of the above-described operation test, and as a control device causing the shopping server 3*a* to perform the processing according to the created programs.

Specific processes performed by the control terminal 3*d* are described later.

In FIG. 1, a variety of configurations for the network 2 may be assumed. For example, the Internet, an intranet, an extranet, a Local Area Network (LAN), a Community Antenna TeleVision (CATV) network, a Virtual Private Network, a telephone network, a mobile communication network, a satellite communication network, and the like can be assumed.

Also, a variety of configuration can be assumed for a communication medium constituting a part or a whole of the network 2. For example, wired media such as based on Institute of Electrical and Electronics Engineers (IEEE) 1394, Universal Serial Bus (USB), power line transmission, and telephone line, and wireless media such as based on infrared like Infrared Data Association (IrDA), Bluetooth (R), 802.11 wireless, a mobile telephone network, a satellite line, and a terrestrial digital network, may be available.

Figure 2:
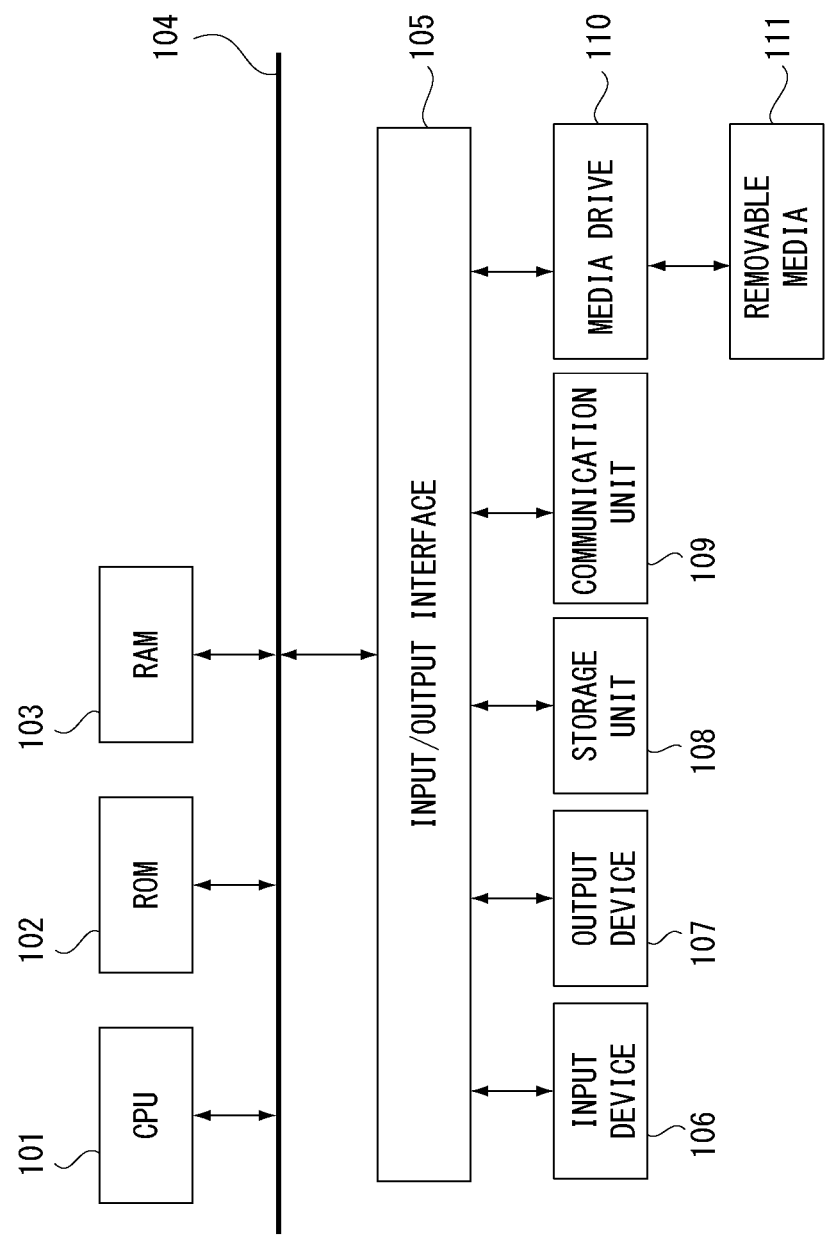
FIG. 2 is a block diagram of a computer device of the embodiment.

FIG. 2 describes a hardware configuration of a computer apparatus that constitutes each of the apparatuses illustrated in FIG. 1, that is, the control terminal 3*d*, the shopping server 3*a*, the product DB 3*b*, the member DB 3*c*, the user terminal 4, and the shop terminal 5.

In FIG. 2, a Central Processing Unit (CPU) 101 of the computer device performs a variety of processes according to programs stored in a Read Only Memory (ROM) 102 and programs loaded from a storage unit 108 to a Random Access Memory (RAM) 103. RAM 103 also appropriately stores data necessary for CPU 101 to perform a variety of processes or similar data.

CPU 101, ROM 102, and RAM 103 are connected with each other via a bus 104. An input/output interface 105 is also connected to the bus 104.

Connected to the input/output interface 105 are: an input device 106, including a keyboard, a mouse, and a touch panel or a similar unit: an output device 107, including a display device such as an Liquid Crystal Display (LCD), Cathode Ray Tube (CRT), an organic Electroluminescence (EL) panel or a similar unit and a speaker or a similar unit: a storage unit 108, including a Hard Disk Drive (HDD), a flash memory device or a similar device: and a communication unit 109 for mutual communication between external devices. The input/output interface 105 is also connected to a media drive 110 as necessary. A removable media 111, such as a magnetic disk, an optical disk, a magneto-optical disk, and a semiconductor memory, is appropriately attached to the media drive 110, so as to write and read information to and from the removable media 111.

In the computer device as described above, data and programs can be uploaded and downloaded through communications by a communication unit 109, and data and programs can also be transferred via the removable media 111.

The CPU 101 performs processing operations based on a variety of programs, so that a computer device as the control terminal 3d, in particular, can perform information processing and communications that will be described later.

3. A Text VPL

In this embodiment, a program for the shopping server 3a to perform predetermined processing, for example, at the time of conducting the above-described A/B test for displaying advertisement, and the like, is created by the control terminal 3d.

At the A/B test, in order to switch the advertisement to be displayed, a related part of the program need to be edited. However, an engineer specialized in program creation is not necessarily present at the A/B test. Thus, an environment where a staff member other than engineers can easily edit a program is in need.

Considering the need, in this embodiment, what is called a Visual Programming Language (hereinafter, referred to as VPL) is adopted as a programming language to be used when creating a program in the control terminal 3d.

However, as described above, an existing VPL is problematic in that VPL requires specialized software to create and edit programs and that program data size is greater compared with other non-VPL programming languages such as C.

To solve these problems, a text based VPL (hereinafter, referred to as text VPL) as described below is adopted as the VPL in this embodiment. By making interpretation of such text VPL possible, a generally applicable programming environment can be provided and program data size can be reduced.

FIG. 3 illustrates the text VPL and shows a program written in the text VPL displayed in a text editor.

The text VPL is a text based programming language data, combining functions and connection characters composed of character data. Relationships between the functions are defined based on positional relations between the functions with reference to the connection characters in a display space of the text editor.

In this embodiment, a program is created to be displayed visually as a flowchart. For this purpose, discrimination functions representing discrimination processes and other ordinary functions are defined as the functions. In a discrimination function, it is stipulated that predetermined character data is to be inserted in predetermined character positions of the function. For a discrimination function in this example, insertion of characters "is" at the beginning of a function is stipulated.

Concerning the content of a process represented by each function, for example, a discrimination function written as "isOver30" in FIG. 3 represents a discrimination process of discriminating whether an age is 30 or over. An ordinary function "giveCarnation" in FIG. 3 represents a process of displaying an advertisement data item about a carnation.

Character data other than the character data used for functions is assigned to connection characters. In this example, character data "-" and "|" are assigned. The connection character "-" denotes the connection character (a first connection character), which connects functions positioned separately in a horizontal direction in a display space of a text editor. The connection character "|" denotes the connection character (a second connection character) which connects functions positioned separately in a vertical direction on the same display space.

"Connection" of functions by the connection characters "-" and "|" is performed in the following manners.

"-" is positioned between two functions in the same line.

"|" is positioned in a line that is sandwiched between line each of which contain two functions to be connected in a vertical direction. The two functions to be connected are arranged to overlap with the "|" in a vertical direction.

In order to perform such "connection", a creator or editor of a program is to arrange positions of a connection character and a function, using character data as "a blank" and control character data as "a line break".

Regarding "a blank", either a blank inputted by a space key, that corresponds to one character, or a blank inputted by a tab key, that corresponds to a plurality of characters, may be used.

In the text VPL of this example, successive positioning of the connection characters "-" and "|" is allowed. Successive positioning of "-" denotes a state where a plurality "-" are successively positioned in a horizontal direction, and successive positioning of "|" denotes a state where a plurality of "|" are successively positioned in a vertical direction.

As will be described later, when a program is interpreted, a plurality of connection characters that are positioned successively are treated as a single unit and treated as equivalent to a single connection character. For example, in FIG. 3 the "-" and "-" between the functions "isOver30" and "isMan" are treated as a single unit. That is, the "-" and "-" is treated as equivalent to the single "-" connecting the functions "isMan" and "Car". Similarly, in FIG. 3, the plurality of successive "|"s connecting the functions "isOver30" and "isOver20" are treated as a single unit. That is, the successive "|"s are treated as equivalent to a single "|" connecting the functions "is14thFeb" and "give Rose".

In the text VPL of this embodiment, relationships between functions are defined based on positional relations between the functions with reference to connection characters in the following manners.

The right side function connected to a discrimination function via "-" is a function to be executed in a "Yes" brunch of the discrimination function.

The lower side function connected to a discrimination function via "|" is a function to be executed in a "No" brunch of the discrimination function.

The right side function connected to an ordinary function via "-" is a function to be executed successively after the ordinary function.

With the text VPL in this example defining the relationships between functions in the manners described above, programs can be created, displaying the processing procedure in a visually understandable manner with a flowchart, as apparent in FIG. 3, even though the programs are based on text.

4. Performance Control of Interpretation and Processing of the Text VPL

Figure 4:
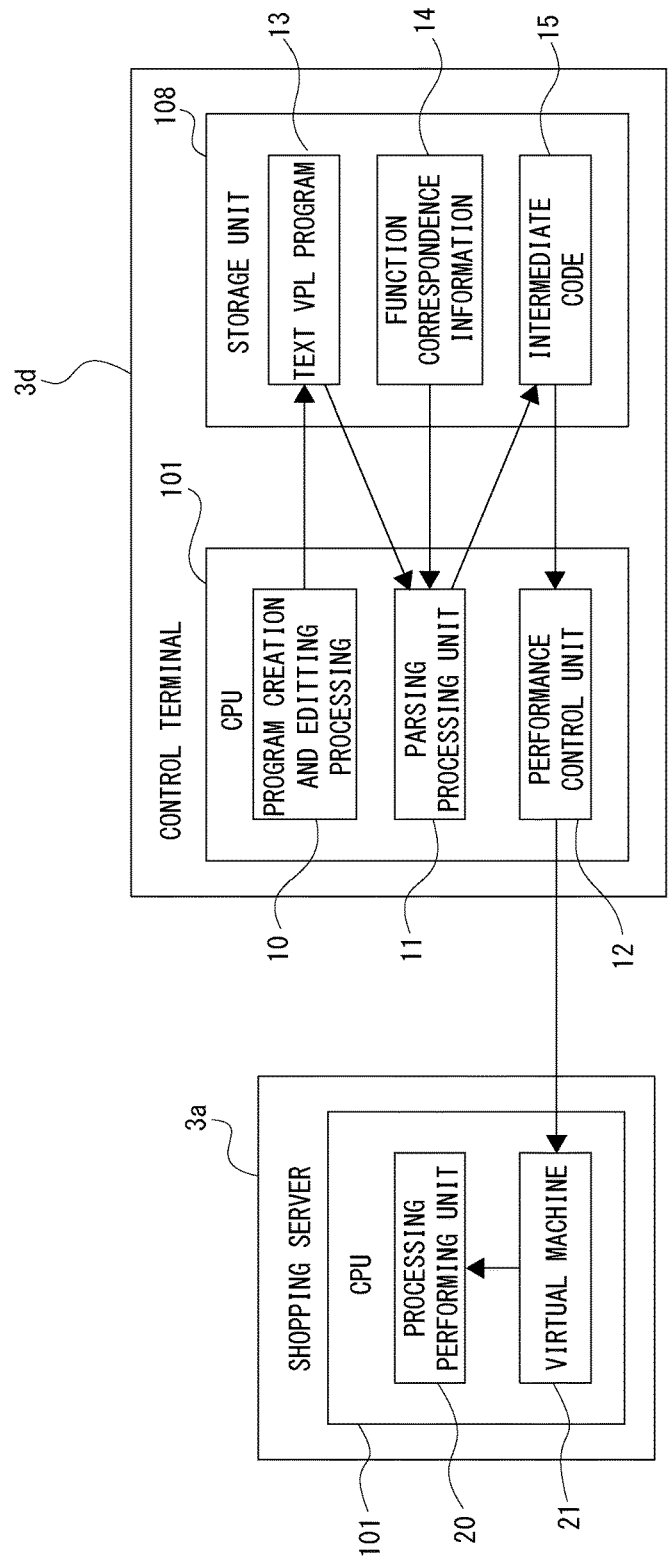
FIG. 4 is a diagram for describing a configuration causing a computer device to perform processing according to a program written in the text VPL.

FIG. 4 describes a configuration for causing the shopping server 3a to perform processes according to programs written in the text VPL. Specifically, FIG. 4 illustrates the CPU 101 in the control terminal 3d and the storage unit 108, and the CPU 101 in the shopping server 3a.

FIG. 4 is a block diagram representing functions each of the CPU 101 in the control terminal 3d and the shopping server 3a. As FIG. 4 shows, the CPU 101 of the control terminal 3d possesses a program creation and editing processing unit 10, a parsing processing unit 11, and a performance control unit 12 as its functions, while the CPU 101 of the shopping server 3a possesses a virtual machine 20 and a processing performing unit 21 as its functions.

The function as the program creation and editing processing unit 10 is to create and edit a program written in the text VPL according to operation inputs, so that a text file as the text VPL program 13 is created and updated. The function as the program creation and editing processing unit 10 is realized by a text editor software application installed into the control terminal 3d.

The function as the parsing processing unit 11 is to parse the text VPL program 13 based on function correspondence information 14 stored in the storage unit 108, and then generate an intermediate code 15 as a code prior to translation into a machine language.

The function correspondence information 14 functions as a translation table for translating functions used in the text VPL, which is described in FIG. 3, to functions used in the intermediate code 15. The function corresponding information 14 stores information on a corresponding function of the intermediate code 15 to each of the functions used in the text VPL.

FIG. 5 describes an example of the intermediate code 15 translated from the program in the text VPL illustrated in FIG. 3.

As FIG. 5 shows, in this example a code in C is generated as the intermediate code 15.

The parsing processing unit 11 works on the text VPL program 13, distinguishing functions and connection characters and performing interpretation processing of relationships of functions based on connection characters. Based on the result of interpretation processing and the function correspondence information 14, the parsing processing unit 11 generates the intermediate code 15.

The intermediate code 15 is not limited to a code in C, and a code can be generated in any programming language other than VPL.

The interpretation processing performed by the parsing processing unit 101 depends on the positional relation between functions with reference to connection characters in a display space of a text editor. The details on the interpretation processing will be described later.

The parsing processing unit 101 causes the storage unit 108 to store the generated intermediate code 15, as illustrated in FIG. 4.

The function as the performance control unit 12 in FIG. 4 is to control performance for causing the CPU 101 of the shopping server 3a to perform processes based on the intermediate code 15.

As a method of translating into a machine language, this example adopts a method similar to Just-in-Time (JIT) compiler and an interpreter, which translates only a necessary part of a target code into a machine language one by one when performing processing, not a method like Ahead of Time (AOT) compiler, which translates the entire target code into a machine language before starting performing processing.

The performance control unit 12 in this example transmits the intermediate code 15 one by one in a predetermined module unit based on the unit of the functions, to the vertical machine 20 of the shopping server 3a. Specifically, the intermediate code 15 is transmitted one by one to the virtual machine 20 of the shopping server 3a, one by one in, for example, the same unit as a function.

The virtual machine 20 translates the transmitted code to a machine language one by one, and sends the translated code to the processing performing unit 21. The processing performing unit 21 performs processes according to the machine language one by one.

By the above-described configuration, processes according to a program created in the text VPL is performed on the shopping server 3a.

When conducting the A/B test, at least two patterns of a display advertisement are displayed and evaluation of each pattern is obtained as the evaluation result. For example, in the exemplary program described in FIG. 3, the staff member conducting the test may, for example, cause the shopping server 3a to perform advertisement display processing according to a program which have the described ordinary function "giveCarnation" as an ordinary function (advertisement display processing) to be executed in the Yes branch of a discrimination function "isPinkLover", and subsequently obtains the evaluation result. Then, the staff member may change the ordinary function "giveCarnation" to other ordinary functions, (for example, "givePinkRose" and the like) and cause the shopping server 3a to perform advertisement display processing again according to the changed program, and subsequently obtains the evaluation result.

When conducting the A/B test in which a target part of a program is changed sequentially as described above one by one, a method like an AOT compiler, which translates the entire target code into a machine language, is undesirable, since such method takes a long time to finish translating and starting processing according to the program, and thus causes delay in testing. Therefore, this embodiment adopts a method like a JIT compiler and an interpreter, which translates a necessary part of the target cord into a machine language one by one when performing processing. Such method allows flexibly to deal with program modification and to provide the most appropriate environment for the A/B test, other operation tests, and the like.

5. Processing Procedure

Specific processing procedure for interpreting the text VPL by the parsing processing unit 11 is illustrated with reference to the flowcharts in FIG. 6 and FIG. 7.

Figure 6:
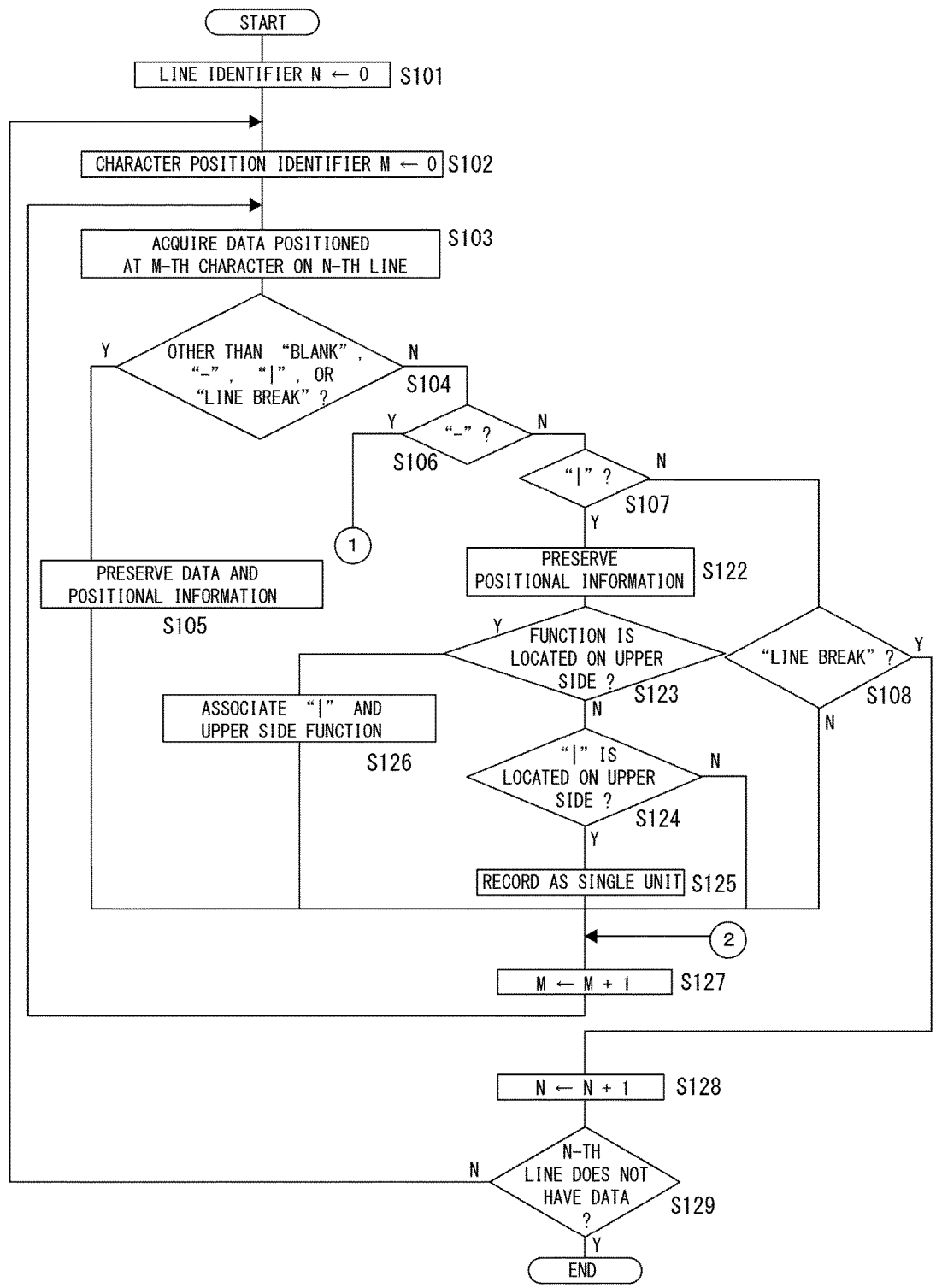
FIG. 6 is a flowchart showing procedure of specific processes performed to interpret the text VPL.
Figure 7:
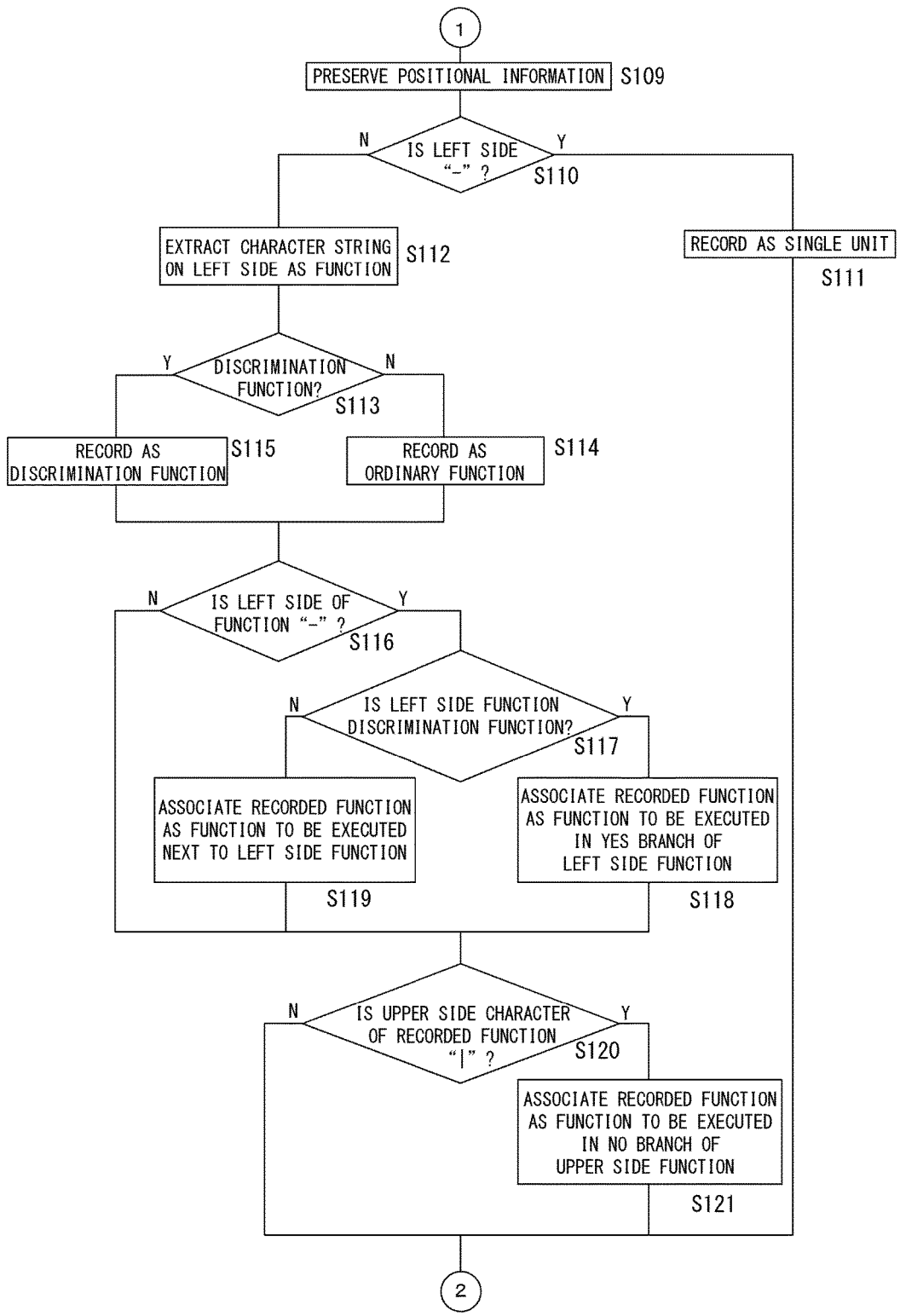
FIG. 7 is also a flowchart showing procedure of specific processes performed to interpret the text VPL.

The processing described in FIG. 6 and FIG. 7 is performed by the CPU 101 of the control terminal 3d according to a program stored in a predetermined storage unit, such as the ROM 102.

First, in FIG. 6, the CPU 101 resets the value of a line identifier n to 0 at a step S101, and resets the value of a character position identifier m to 0 at a step S102. The line identifier n is a value for identifying a "line" in the display space of a text editor, while the character position identifier m is a value to identify a character position on each line (the number of characters counted from the beginning of each line).

In response to the resetting processes at the steps S101 and S102, the CPU 101 acquires the data positioned at the m-th character on the n-th line at a step S103. Subsequently, at a step S104, the CPU 101 discriminates whether the acquired data is other than "blank", "-", "|", or "a line break", or not.

At the step S104, in a case where the acquired data is other than "blank", "-", "|", or "a line break", the CPU 101 proceeds to a step S105, preserving the data and its positional information (the m-th character on the n-th line), then at a step S127, the character position identifier m is incremented by 1 and the CPU 101 returns to the step S103. When the acquired data is other than "blank", "-", "|", or "a line break" as this case, the data and its positional information is preserved and data of the character position next to the data on the n-th line is acquired.

On the other hand, at the step S104, in a case where the acquired data is not other than "blank", "-", "|", or "a line break", the CPU 101 proceeds to a step S106 and discriminates whether the acquired data is "-" or not.

If the acquired data is not "-", the CPU 101 discriminates whether the acquired data is "|" or not at a step S107. If the acquired data is not "|", then the CPU 101 discriminates whether the acquired data is "a line break" or not at a step S108.

In other words, through the steps from S106 to S108, the CPU 101 discriminates whether the data acquired at the step S103 is "blank", "-", "|", or "a line break".

First, the processing to be performed when the acquired data is discriminated to be "-" by discrimination processing at the step S106 is described with reference to the flowchart in FIG. 7. In FIG. 7, while preserving the positional information of the acquired "-" data at a step S109, the CPU 101 discriminates whether the left side character of the "-" is also "-" or not at a step S110. In a case where the left side character is also "-", the CPU 101 proceeds to a step S111 and records the acquired "-" and its left side "-" as a single unit and then proceeds to a step S127 in FIG. 6.

That is, after recording successively positioned "-" and "-" as a single unit, data of a next character position is acquired.

On the other hand, in case the left side character is not "-", the CPU 101 proceeds to a step S112 and extracts a character string on the left side as a function, and at a subsequent step S113, the CPU 101 discriminates whether the extracted function is a discrimination function or not. That is, in this example, the CPU 101 discriminates whether the character string as the function extracted at the step S112 has the two characters "is" inserted at the beginning of the character string or not.

In a case where the extracted function is not a discrimination function at the step S113, the CPU 101 records the function as an ordinary function at a step S114, and then proceeds to a step S116. Alternatively, in a case where the extracted function is a discrimination function, the CPU 101 records the function as a discrimination function at a step S115 and then proceeds to the step S116.

At the step S116, the CPU 101 discriminates whether the left side character of the function (the function recorded at steps S114 or S115) is "-" or not.

If the left side is not "-", the CPU 101 proceeds to a step S120.

Alternatively, if the left side character is "-", the CPU 101 discriminates whether the left side function of the "-" is a discrimination function or not at a step S117. In a case where the left side function is a discrimination function, the recorded function (the function recorded at steps S114 or S115) is associated as a function to be executed in the YES branch of the left side function (the discrimination function) at a step S118, and then the CPU 101 proceeds to the step S120.

In addition, in a case where the left side function of the "-" is not a discrimination function, the CPU 101 associates the recorded function as a function to be executed next to the left side function (the ordinary function) at a step S119 and then proceeds to the step S120.

By the processes described above, for example, as illustrated in the relationship between the functions "isMan" and "Car" in FIG. 3, when one function ("Car") has a connection character "-" on its left side and the "-" has a discrimination function ("isMan") connected to its left side, the function "Car" is associated as a function to be executed in the Yes branch of the discrimination function. Similarly, for example, as illustrated in the relationship between the functions "giveCarnation" and "bookRestaurant" in FIG. 3, when one function ("giveCarnation") has a connection character "-" on its left side and the "-" has an ordinary function ("bookRestaurant") connected to its left side, the function "giveCarnation" is associated as a function to be executed next to the ordinary function.

At the step S120, the CPU 101 discriminates whether the upper side character of the recorded function is "|" or not. If the upper side character is "|", the CPU 101 associates the recorded function as a function to be executed in the No branch of the function above the "|" at a step S121, and then proceeds to a step S127 illustrated in FIG. 6.

Alternatively, if the upper side character of the recorded function is not "|", the CPU 101 skips the step S121 and proceeds to the step S127.

Accordingly, for example, as illustrated in the relationship between the functions "isOver30" and "isOver20" in FIG. 3, when one function ("isOver20") has a connection character "|" as its upper side character and the "|" has a discrimination function (isOver30) connected to its upper side, the function "isOver20" is associated as a function to be executed in the No branch of the discrimination function.

Referring back to FIG. 6, the processes to deal with the cases where the data of m-th letter on n-th line is "|", "blank", or "a line break" is described in the following.

When the acquired data at the step S103 is "|" at the step S107, the CPU 101 proceeds to a step S122, preserving the positional information of the "|". After proceeding to a step S123, the CPU 101 discriminates whether the "|" has a function on its upper side or not.

If "|" does not have a function on its upper side, the CPU 101 proceeds to a step 124 and discriminates whether the upper side of "|" is "|" or not. If the upper side is "|", the CPU 101 records the two "|"s as a single unit at a step S125 and proceeds to the step S127.

If the upper side of "|" is not "|" (that is, the upper side of "|" is neither a function nor "|"), the CPU 101 skips the step S125 and proceeds to the step S127. However, a case where the upper side of "|" is neither a function nor "|" is not permitted by the programming rules of the text VPL.

Alternatively, if "|" has a function on its upper side at the step S123, the CPU 101 proceeds to a step S126 and associates the "|" with the function on its upper side, and then proceeds to the step S127.

Subsequently, at the step S108, in a case where the data acquired at the step S103 is not "a line break", that is the acquired data is "blank", the CPU 101 proceeds to the step S127. When the acquired data is blank as such a case, processing such as preservation of positional information of the "blank" data is not performed, and the processing proceeds to work on its next character position.

Meanwhile, in a case where the acquired data is "a line break", the CPU 101 proceeds to a step S128 and increments the value of a line identifier n by 1. Then the CPU 101 proceeds to a step S129 and discriminates whether the line n has any data or not.

If the line n has data, the CPU 101 returns to the step S102 and reset the value of the character position identifier m to 0. That is, the processing moves on to the initial character of the next line.

If the line n does not have data, the CPU 101 terminates the processing described in FIG. 6 and FIG. 7.

Through the processing described in FIG. 6 and FIG. 7, for programs written in the text VPL, the relationships between functions can be interpreted based on positional relationships between the functions with reference to connection characters in the display space of a text editor.

6. Summary of Embodiments

As described above, the information processing device (the control terminal 3d) in this embodiment includes a storage unit (the storage unit 108) and an interpretation processing unit (the parsing processing unit 11). The storage unit stores programming language data, which is a text based programming language data (the text VPL program 103) combining functions and connection characters composed of character data and defines relationships between functions based on positional relation between the functions with reference to connection characters in the display space of a text editor. The interpretation processing unit distinguishes the functions and the connection characters in character strings of the programming language data and interprets relationships between the functions based on the positional relations in the display space.

The programming language data described in this embodiment, though being a text based language, displays relationships between functions based on the positional relations between the functions with reference to connection characters in the display space of a text editor in a visually understandable manner. That is, the programming language data functions as a VPL. Such text VPL does not require specialized software to create and edit programs, thus provides a generally applicable programming environment. In addition, since such a VPL is text based, program data size can be relatively reduced.

The information processing device according to this embodiment enables interpretation of the text VPL, so that the programming environment of the text VPL as described above can be realized. By making the interpretation of the text VPL possible, processing according to the text VPL by a computer device is made possible, so that a programming environment using the text VPL is realized.

In other words, a generally applicable programming environment using the text VPL can be realized and the program data size can be reduced.

This embodiment includes discrimination functions representing discrimination processing as a function and a first connection character connecting functions positioned separately in a horizontal direction and a second connection character connecting functions positioned separately in a vertical direction in the display space specifically as connection characters.

In the information processing device of this embodiment under this condition, the interpretation processing unit identifies a data type of each character on each line in the programming language data, distinguishes the functions and the connection characters, discriminates whether a function is a discrimination function or not, then with the function discriminated as the discrimination function, associates the right side function connected to the function via the first connection character as a function to be executed in either a Yes branch or a No branch, and associates the lower side function connected to the function via the second connection character as a function to be executed in either of the Yes branch or the No branch, to which a branch has not been assigned.

These processes enable interpretation of programs which are displayed visually as a flowchart in the text VPL.

Accordingly, programs can be created and edited as a flowchart in a visually understandable manner, the easiness to create and edit programs can be improved.

Further, in the information processing device according to this embodiment, the interpretation processing unit discriminates whether a function is a discrimination function or not, depending on the presence or absence of predetermined characters in the function.

As apparent from the above description, in the text VPL according to this embodiment, a discrimination function is the only function that is connected to other functions via both of the connection characters "-" and "|". Therefore, a function that is connected to other functions via both of the connection characters "-" and "|" may be normally discriminated as a discrimination function.

However, in order to discriminate whether a function is connected to other functions via both of the connection characters "-" and "|" or not, the interpretation processing unit needs to read a line below the line on which the target function is present, when discriminating whether the function is a discrimination function or not. Consequently, the processing load required for discriminating whether the function is a discrimination function or not increases.

For this reason, discrimination of a discrimination function based on the presence or absence of predetermined characters in a function as described above eliminates a need to read a line below the line on which a target function is present, when discriminating whether the function is a discrimination function or not.

Accordingly, this embodiment avoids increase in the processing load required for discriminating whether the function is a discrimination function or not.

Furthermore, in the information processing device according to this embodiment, the interpretation processing unit treats first connection characters positioned successively in a horizontal direction and second connection characters positioned successively in a vertical direction as each single unit.

Thus, successive positioning of first connection characters or second connection characters is permitted as a programming rule of the text VPL.

When a program is written as a flowchart as described in FIG. 3, the following case is assumed; a case where the first discrimination function (for example, "isOver30" in FIG. 3) has the second discrimination function ("isMan") positioned as a function to be executed in a Yes branch, and the first discrimination function has the third discrimination function ("isOver20") positioned as a function to be executed in a No branch. If successive positioning of connection characters is not permitted in this case, the positions of the function to be executed in the No branch of the second discrimination function ("is14thFeb") and the function to be executed in the YES branch of the third discrimination function ("isSweetsLover") overlap, rendering positioning of the function to be executed in the Yes branch of the third discrimination function impossible.

In this case, for example, if successive positioning of the second connection characters ("|") is permitted, the third discrimination function can be positioned on a line separated by a plurality of lines from a line having the first discrimination function, thus preventing overlap of positions of functions. Accordingly, the degree of freedom to create and edit programs can be improved.

Similarly, with successive positioning of the first connection characters ("-") and the second connection characters permitted, positions of functions can be adjusted in terms of both horizontal and vertical directions. Accordingly, easily viewable flowcharts can be created and program contents are more visually understandable as a result.

Furthermore, in the information processing device of this embodiment, the interpretation processing unit generates an intermediate code (the intermediate code 15) based on the interpretation result of relationships between functions, as a code prior to translation into a machine language.

Accordingly, the text VPL is translated into an intermediate code in a predetermined programming language, such as C.

Since the text VPL is translated to a machine language via an intermediate code, rather than translating the text VPL directly into a machine language, existing interpreters and compilers can be used to generate the machine language, increasing general applicability in this respect as well.

Further, the information processing device of this embodiment includes a performance control unit (the performance control unit 12), which controls by causing processes according to an intermediate code one by one in a predetermined module unit based on the unit of a function.

By performing processes one by one, programs can be modified flexibly. In addition, the need to translate the entire intermediate code into a machine language for performing processing is eliminated.

As programs can be modified flexibly, a most suitable environment can be provided for the above-described A/B test, various operation tests, and the like.

As the need to translate the entire intermediate code into a machine language is eliminated, the time required for starting the processing can be shortened, and the processing load for translation into a machine language (in this embodiment, the processing load of the shopping server 3a) can be reduced.

When performing processes according to an intermediate code one by one as described above, the result of discrimination processing based on a discrimination function can be used. This allows limiting the process of translation into a machine language only to a code to be executed either in a Yes branch or a No branch of the discrimination function, thus radically reducing the processing load.

At this processing, like this embodiment, in such a case where a device to create and edit programs that use the text VPL (the control terminal 3d) is different from a device to perform processing according to a program (the shopping server 3a), configuration such that the shopping server 3a sends the result of discrimination processing based on a discrimination function as feedback to the control terminal 3d may be provided. Then, the performance control unit 12 transmits a only necessary code from the intermediate code 15 to the shopping server 3a (the virtual machine 20) one by one, based on the result of discrimination, and causes the shopping server 3a to translate the code into a machine language.

Besides, a device to create and edit programs that use the text VPL and a device to perform processing according to a program may be identical. In this case, the above described configuration for sending the result of discrimination as feedback from one device to another is not necessary.

7. A Program and a Storage Medium

The control terminal 3d as an embodiment of the information processing device according to the present invention has been described above. The program of this embodiment is a program causing an information processing device (for example, a CPU) to perform processing of the control terminal 3d.

The program of this embodiment is a text based programming language data combining functions and connection characters composed of character data, and the program causes an information processing device including a storage unit to perform processing. The storage unit stores the programming language data in which the relationships between functions are defined by the positional relations between functions with reference to connection characters in a display space of a text editor. The program causes the information processing device to perform interpretation processing to distinguish functions and connection characters in the character strings of the programming language data and interpret the relationships between functions, based on the positional relations between the functions in the display space.

In other words, this program corresponds to the program causing an information processing device (the control terminal 3d) to perform processing described in FIG. 6 and FIG. 7.

The program enables the information processing device to be implemented as the above-described control terminal 3d.

The program may be stored in advance in HDD as a storage medium built in a device such as a computer device or in ROM in a microcomputer having a CPU. Alternatively, the program may be temporarily or permanently stored in a removable storage medium, such as semiconductor memory, a memory card, an optical disk, a magneto-optical disk, or a magnetic disk. The removable storage medium may be provided as what is called packaged software.

The program may be installed into a device such as a personal computer from the removable storage medium, or may be downloaded from a download site via a network such as a LAN or the Internet.

8. Variations

The present invention is not limited to the above described example, and variations may be conceived.

For example, in the above-described embodiment, a program in the text VPL (a source code) is translated first into an intermediate code, then the intermediate code is translated into a machine language. However, a program in the text VPL may be translated directly into a machine language.

Translation into a machine language is not limited to only the one-by-one translation of necessary parts as described above, but the entire target code may be translated in advance like an AOT compiler.

Further, character data other than "-" or "|" may be assigned to connection characters.

Besides, a method to discriminate whether a function is a discrimination function or not is not limited to a method based on the presence or absence of predetermined characters in the function as described above. Other methods, such as a method discriminating whether a target function is connected to other functions via both of the first connection character and the second connection character or not, may be adopted.

REFERENCE SIGNS LIST 1. network system
2. network
3. shopping site management system
3a. shopping server
3b. product DB (database)
3c. member DB
3d. control terminal 4. user terminal
5. shop terminal
10. program creation and editing processing unit
11. parsing processing unit
12. performance control unit
13. text VPL program
14. function correspondence information
15. intermediate code

What is claimed is:

1. A method performed by at least one computer processor in a computer apparatus comprising a storage unit storing a programming language data that is a text based programming language data combining functions and connection characters composed of character data, and defines a relationship between the functions based on a positional relation of the functions with reference to the connection characters in a display space of a text editor, the functions including determination functions representing determination processing, the connection character including a first connection character connecting functions positioned separately in a horizontal direction and a second connection character connecting functions positioned separately in a vertical direction in the display space specifically, the method comprising:
 distinguishing the functions and the connection characters by identifying a data type of each character on each line in the programming language data;
 discriminating whether a function is a discrimination function or not;
 associating a right side function connected to the function determined to be the discrimination function via the first connection character as a function to be executed in either a Yes branch or a No branch;
 associating a lower side function connected to the function determined to be the discrimination function via the second connection character as a function to be executed in either of the Yes branch or the No branch, to which a branch has not been assigned as the processing of distinguishing the functions and the connection characters in a character string of the programming language data;
 interpreting relationships between the functions based on the positional relations in the display space;
 generating an intermediate code as a code prior to translation into a machine language, based on a result of interpreting relationships between the functions and controlling to perform processes according to the intermediate code one by one in a predetermined module unit based on a unit of the functions;
 allowing interpretation processing code of the text based programming language data such that the processes instructed in the text based programming language data are performed in the computer apparatus, and a programming environment employing the text based programming language data is achieved to reduce program data size, wherein the text based programming language data is as a text Visual Programming Language (VPL); and
 generating code in the machine language based on the interpreted relationships between the functions.

2. A computer apparatus comprising:
 a storage unit configured to store programming language data that is text based programming language data combining functions and connection characters formed of character data, and defines a relationship between the functions based on a positional relation between the functions with reference to the connection characters in a display space of a text editor, the functions including determination functions representing determination processing, the connection character including a first connection character connecting functions positioned separately in a horizontal direction and a second connection character connecting functions positioned separately in a vertical direction in the display space specifically;
 at least one memory configured to store computer program code; and
 at least one processor configured to access said at least one memory and operate as instructed by said computer program code, said computer program code including:
 interpretation processing code configured to cause said at least one processor to distinguish the functions and the connection characters by identifying a data type of each character on each line in the programming language data, discriminate whether a function is a discrimination function or not, then with the function discriminated as the discrimination function, associate a right side function connected to the function via the first connection character as a function to be executed in either a Yes branch or a No branch, associate a lower side function connected to the function via the second connection character as a function to be executed in either of the Yes branch or the No branch, to which a branch has not been assigned as the processing of distinguish the functions and the connection characters in a character string of the programming language data, interpret a relationships between the functions based on the positional relation in the display space,
 wherein the interpretation processing code causes said at least one processor to generate an intermediate code as a code prior to translation into a machine language, based on a result of interpreting relationships between the functions and control to perform processes according to the intermediate code one by one in a predetermined module unit based on a unit of the functions;
 allow the interpretation processing code of the text based programming language data such that the processes instructed in the text based programming language data are performed in the computer apparatus, and a programming environment employing the text based programming language data is achieved to reduce program data size, wherein the text based programming language data is as a text Visual Programming Language (VPL); and
 generate code in the machine language based on the interpreted relationships between the functions.

3. The computer apparatus according to claim 2, wherein the interpretation processing code discriminates whether a function is a discrimination function or not based on presence or absence of predetermined characters in the function.

4. The computer apparatus according to claim 2, wherein the interpretation processing code causes said at least one processor to treat the first connection characters positioned successively in the horizontal direction and the second connection characters positioned successively in the vertical direction as a single unit.

5. The computer apparatus according to claim 2, wherein the first connection character and the second connection character are textual characters.

6. The computer apparatus according to claim 5, wherein the first connection character is "-", and wherein the second connection character is "|".

7. A non-transitory computer readable storage medium having thereon stored a computer program causing a computer apparatus comprising a storage unit storing a programming language data, which is a text based programming language data combining functions and connection characters composed of character data and defines a relationship between the functions based on a positional relation of the functions with reference to the connection characters in a display space of a text editor, the functions including determination functions representing determination processing, the connection character including a first connection character connecting functions positioned separately in a horizontal direction and a second connection character connecting functions positioned separately in a vertical direction in the display space specifically, the storage medium storing the computer program for causing the computer apparatus to perform interpretation processing of:

- distinguishing the functions and the connection characters by identifying a data type of each character on each line in the programming language data;
- discriminating whether a function is a discrimination function or not,
- associating a right side function connected to the function determined to be the discrimination function via the first connection character as a function to be executed in either a Yes branch or a No branch,
- associating a lower side function connected to the function determined to be the discrimination function via the second connection character as a function to be executed in either of the Yes branch or the No branch, to which a branch has not been assigned as the processing of distinguishing the functions and the connection characters in a character string of the programming language data and
- interpreting relationships between the functions based on the positional relation in the display space,
- generating an intermediate code as a code prior to translation into a machine language, based on a result of the interpreting relationships between the functions and controlling to perform processes according to the intermediate code one by one in a predetermined module unit based on a unit of the functions,
- allowing interpretation processing code of the text based programming language data such that the processes instructed in the text based programming language data are performed in the computer apparatus, and a programming environment employing the text based programming language data is achieved to reduce program data size, wherein the text based programming language data is as a text Visual Programming Language (VPL); and
- generating code in the machine language based on the interpreted relationships between the functions.

* * * * *